United States Patent [19]

Okuyama et al.

[11] Patent Number: 4,550,349
[45] Date of Patent: Oct. 29, 1985

[54] PLAYBACK SPEED CONTROLLER FOR VIDEO TAPE RECORDER

[75] Inventors: Yoshikazu Okuyama, Saitama; Hajime Takeuchi, Kanagawa, both of Japan

[73] Assignee: Sony Corporation, Tokyo, Japan

[21] Appl. No.: 478,141

[22] Filed: Mar. 23, 1983

[30] Foreign Application Priority Data

Mar. 30, 1982 [JP] Japan .................................. 57-51673

[51] Int. Cl.[4] .................... G11B 19/26; G11B 27/02
[52] U.S. Cl. .................................. 360/10.2; 360/14.3; 360/72.2; 360/73; 360/77
[58] Field of Search ............... 360/10.2, 10.3, 14.1, 360/14.2, 14.3, 73, 10.1, 72.2, 74.4, DIG. 1, 70, 77; 364/174, 193

[56] References Cited

U.S. PATENT DOCUMENTS

| | | | |
|---|---|---|---|
| 4,100,607 | 7/1978 | Skinner | 360/14.2 X |
| 4,326,225 | 4/1982 | Osanai | 360/74.1 |
| 4,358,798 | 11/1982 | Hedlund et al. | 360/73 |
| 4,459,622 | 7/1984 | Corkery | 360/73 X |

FOREIGN PATENT DOCUMENTS

| | | |
|---|---|---|
| 1328014 | of 0000 | United Kingdom . |
| 2017352 | of 0000 | United Kingdom . |
| 2060203 | 4/1981 | United Kingdom .............. 360/10.2 |

OTHER PUBLICATIONS

International Broadcast Engineer, "The TR-800 VTR a Computer Based Total System Design", vol. 12, No. 176, 3/81, Hedlund, pp. 18-26.

Rabin, "The NEC CTT-7000", IBE International Broadcast Engineer, vol. 12, No. 176, pp. 28-29, Mar. 1981.

Geise, "The use etc", SMPTE, vol. 88, No. 12, pp. 831-834, Dec. 1979.

Swetland, "A new etc", SMPTE, vol. 88, No. 7, pp. 483-485, Jul. 1979.

*Primary Examiner*—Raymond F. Cardillo, Jr.
*Assistant Examiner*—Steven R. Garland
*Attorney, Agent, or Firm*—Lewis H. Eslinger; Alvin Sinderbrand

[57] ABSTRACT

A video signal reproducing device for use with a magnetic tape has at least one rotary magnetic head which reproduces the video signals recorded in slant tracks on the tape and a tape transport mechanism which drives the tape at controllably varied speeds. A first circuit selectively generates tape speed signals indicative of respective speeds of the tape. A second circuit selectively generates duration signals indicative of the time periods during which the tape is driven at the respective speeds. A memory stores the tape speed signals and the duration signals, and a system controller connected to the memory controls the tape transport mechanism to drive the tape at speeds and for durations determined by the tape speed signals and the respective duration signals read from the memory.

15 Claims, 7 Drawing Figures

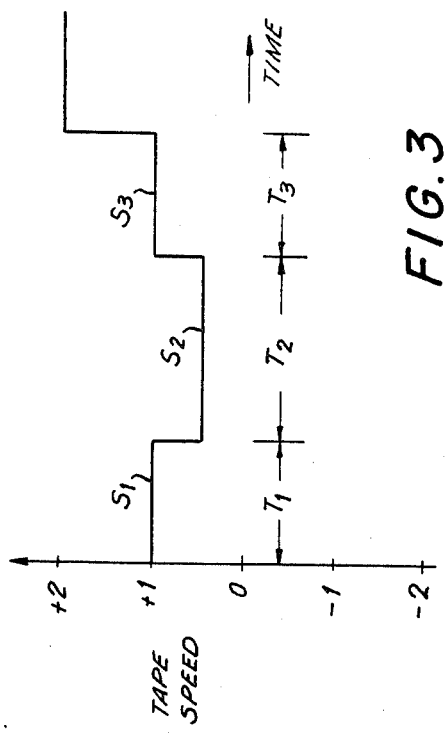
FIG. 2
FIG. 3
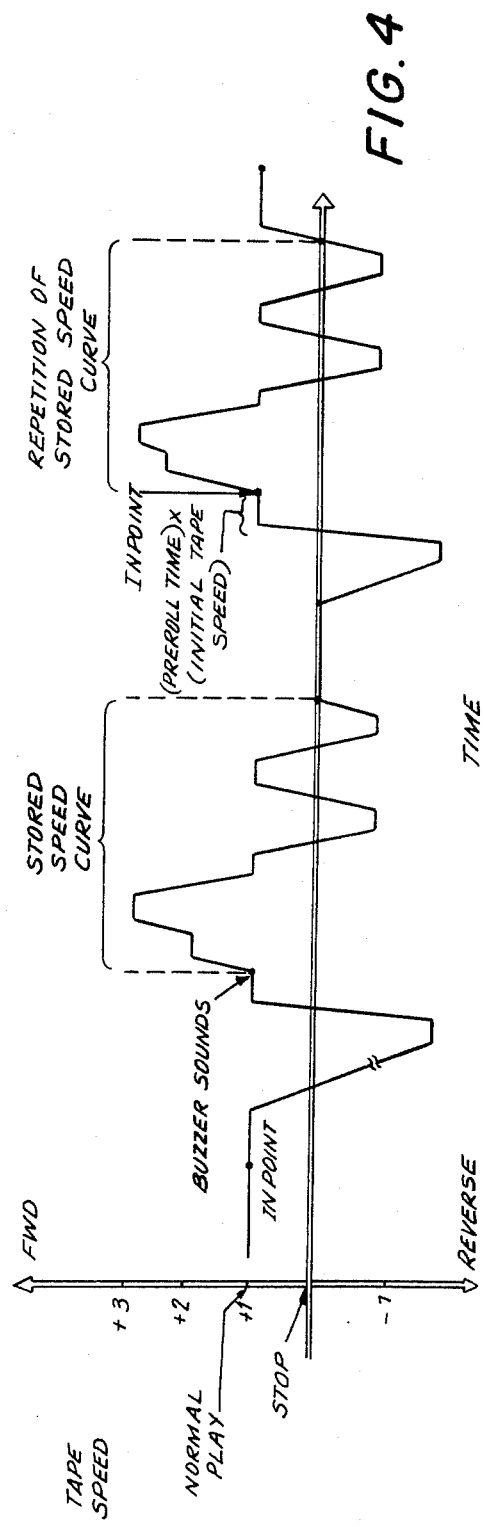
FIG. 4

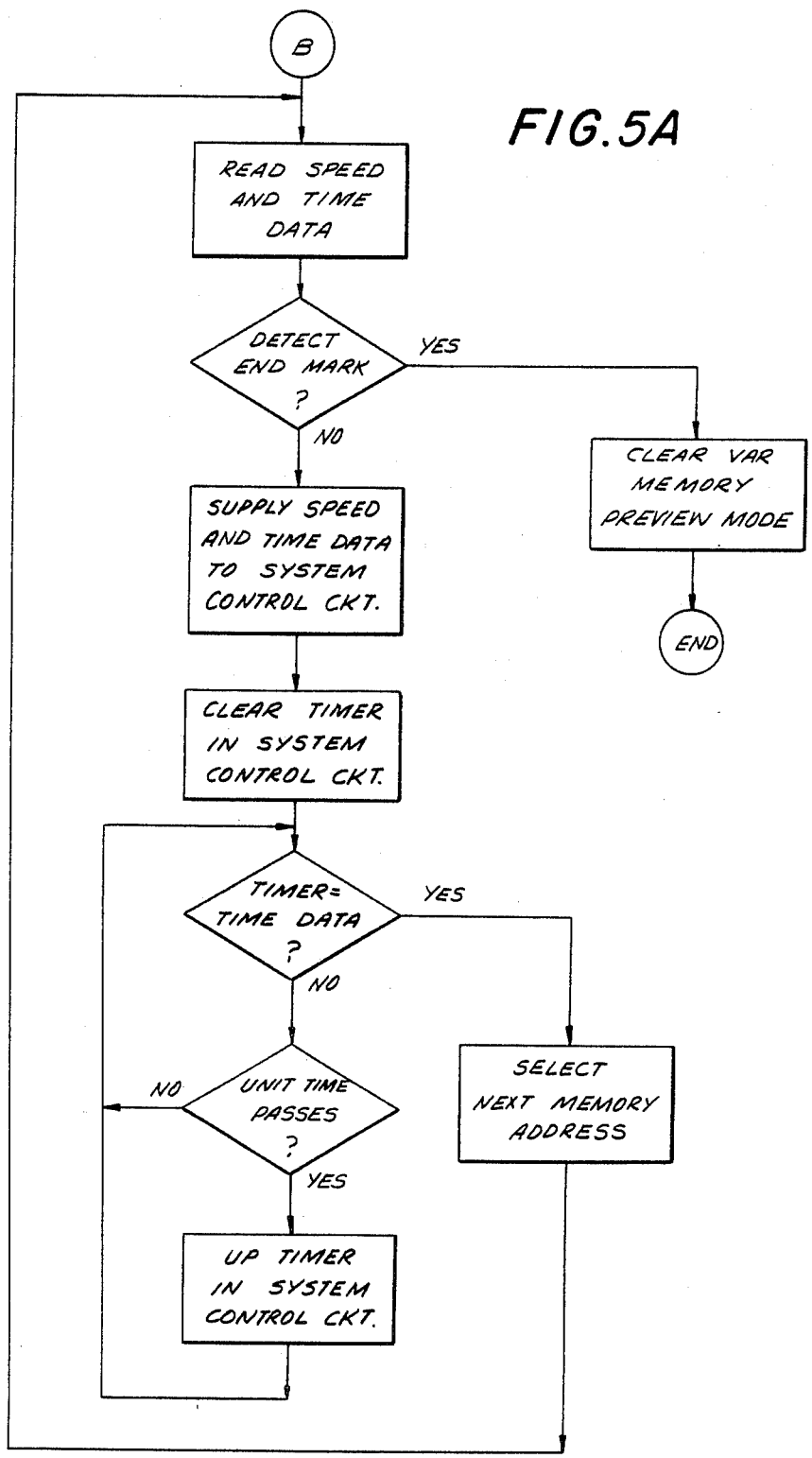

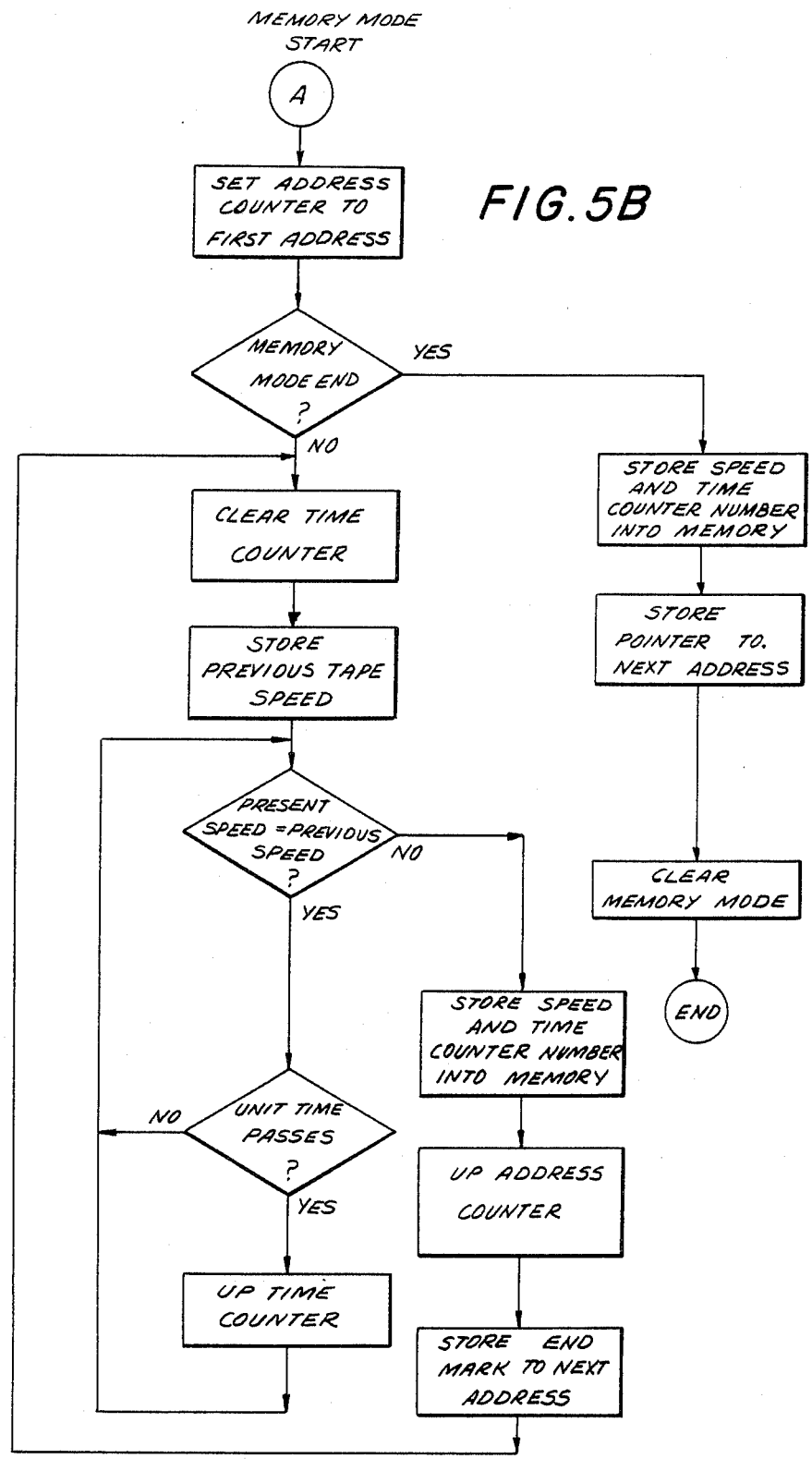

PLAYBACK SPEED CONTROLLER FOR VIDEO TAPE RECORDER

BACKGROUND OF THE INVENTION

1. Field of the Invention

This invention relates to information signal reproducing devices, and more particularly, to a video signal reproducing device which reproduces a video signal at controllably varied speeds.

2. Description of the Prior Art

In an information signal reproducing apparatus such as a video tape recorder (VTR), it is sometimes desirable to play the recorded video signals at a slower or faster speed than normal reproduction. For example, in sports events, a particularly important portion of the event can be replayed at varying speeds for analysis wherein audio commentary is added to the broadcast.

Existing video signal reproducing devices include a manually operated search dial which is continuously variable from reverse speed to faster than normal speed. The search dial is used to effect the above-described variable play of the recorded video signals. However, each time the video signal is to be replayed, a human operator must adjust the playback speed. Consequently, variations occur when the selected portion is replayed more than once. If certain portions of the tape are to be replayed at speeds different than other portions, the operator must pay careful attention to the video signal each time it is replayed so that the proper adjustments can be made. Naturally, there is considerable room for error in such a system.

OBJECTS AND SUMMARY OF THE INVENTION

It is accordingly an object of the present invention to provide a video signal reproducing apparatus which avoids the above-described problems inherent in the prior art.

It is another object of the present invention to provide a video signal reproducing apparatus which permits repeated replay of a selected portion of a video signal at various reproducing speeds.

It is still a further object of the present invention to provide a video signal reproducing apparatus which permits variable speed replay of a video signal to be preset and then subsequently executed.

In accordance with the present invention, an information signal reproducing apparatus for use with a magnetic tape includes a transducer means for reproducing the information signals recorded in slant tracks on the tape, tape transport means for driving the tape at controllably varied speeds, means for selectively generating tape speed signals indicative of speeds of the tape, means for selectively generating duration signals indicative of the time periods during which the tape is driven at the respective speeds, memory means for storing the tape speed signals and the duration signals, and systems control means for controlling the tape transport means to drive the tape at speeds and for durations determined by the tape speed signals and the respective duration signals read from the memory means.

The above, and other objects, features and advantages of the present invention will apparent from the following detailed description of an illustrative embodiment thereof which is to be read in connection with the accompanying drawings.

BRIEF DESCRIPTION OF THE DRAWINGS

FIG. 2 is a schematic diagram illustrating the allocation of memory space in a memory included in the apparatus of FIG. 1;

FIG. 3 is a graph illustrating the speed and time duration signals stored in the memory of FIG. 2;

FIG. 4 is a graph illustrating the tape movements performed with an embodiment of the video signal reproducing apparatus in accord with the present invention; and FIGS. 5A to 5C are flow charts illustrating a program for use with the apparatus of FIG. 1.

DETAILED DESCRIPTION OF THE PREFERRED EMBODIMENT

Figure 1:
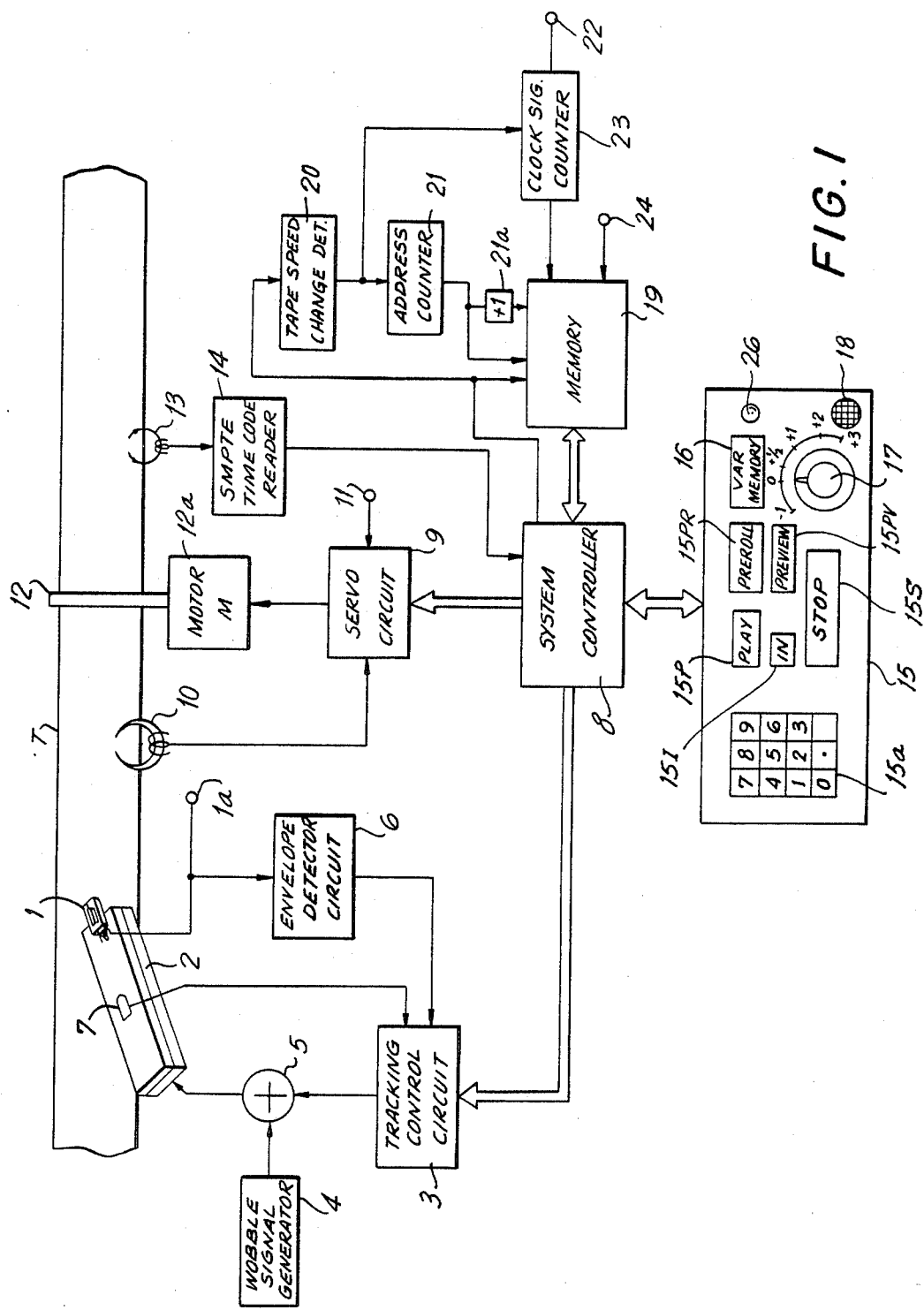
FIG. 1 is a block diagram of a video signal reproducing apparatus in accord with the present invention.

Referring to the drawings and initially to FIG. 1 thereof, a video signal reproducing apparatus in accord with the present invention includes a rotary magnetic head 1 mounted on a rotary drum for reproducing video signals recorded in slanted or helical tracks on a magnetic tape T. Rotary magnetic head 1 is attached to a tracking position adjusting member 2 which can be an electro-mechanical transducer such as a bimorph plate. The reproduced video signal from rotary magnetic head 1 is supplied to an output terminal 1a for subsequent processing. A tracking control circuit 3 generates a control signal having a DC voltage component which is supplied, together with a wobbling or dither signal from a wobble signal generator 4, to an adder circuit 5. The output signal from adder circuit 5 is supplied to tracking position adjusting member 2, i.e., a control voltage is supplied across the electrodes attached to both surfaces of the bimorph plate to rotary magnetic head 1 diametrically to trace or scan a desired record track. It is to be appreciated that even if the transport speed of video tape T is different from the transport speed for recording (i.e., normal speed), rotary magnetic head 1 will be shifted or displaced by a predetermined distance in a direction across its scanning direction so that accurate tracking of the desired record track is performed.

The reproduced video signal from rotary magnetic head 1 is also supplied to an envelope detector circuit 6 which supplies an output signal in response thereto to tracking control circuit 3. Tracking control circuit 3 controls the relative position of rotary magnetic head 1 so that the output signal from envelope circuit 6 reaches its maxiumum level to effect accurate tracking.

A strain gauge 7 is bonded or mounted on the surface of tracking position adjusting number 2. Strain gauge 7 detects the displacement of tracking position adjusting member 2 and supplies a corresponding signal to tracking control circuit 3 as a reference level signal. Tracking control circuit 3 then generates its control signal using the detected signal from strain gauge 7 as the reference signal.

The control of the tracking of magnetic head 1 as described above is disclosed in the Sakamoto U.S. Pat. No. 4,296,443, assigned to the assignee of the present invention.

A system controller 8 generates command signals to control the movements of magnetic tape T. In a preferred embodiment, system controller 8 includes a micro-processor for generating the required command signals. When the illustrated embodiment of a video signal reproducing apparatus is operated in a mode in which frames are dropped at predetermined intervals, system controller 8 supplies command signals to tracking control circuit 3 which then supplies the required control signal to tracking position adjusting member 2. A servo circuit 9 controls the rotation of a capstan motor 12a associated with a capstan 12 whereby magnetic tape T moves at a predetermined speed. Servo circuit 9 receives as its input signals the command signals from system controller 8, a control signal reproduced from a control signal playback head 10, and a reference signal supplied from a reference input terminal 11.

A time code playback head 13 detects the SMPTE time code recorded on magnetic tape T and supplies the reproduced signal to an SMPTE time code reader 14. SMPTE time code reader 14 reads an address signal reproduced by playback head 13 and supplies a corresponding output signal to system controller 8. The output signal from SMPTE time code reader 14 is used to determine an "in" point address in a playback operation, as will be described more fully hereinbelow.

A controller 15 is connected by a bus line to system controller 8. As more fully described hereinbelow, controller 15 is used to preset selected movements of magnetic tape T. For example, with the use of controller 15, video signals recorded on magnetic tape T can be replayed more than one time at various speeds in order to emphasize certain portions of the signals. Controller 15 includes a keyboard 15a for entering "in" or "out" point addresses where the selected tape movements begin or end, respectively. In addition, an "in" point address control element 15I is used to enter an "in" point address. "In" point address control element 15I is actuated to memorize the current SMPTE time code detected by time code playback head 13 and read by SMPTE time code reader 14. In a preferred embodiment, "in" point address control element 15I can be actuated regardless of the speed at which magnetic tape T is being transported to memorize a selected "in" point location. Controller 15 includes a stop control element 15S for stopping the tape drive, and a play control element 15P for starting the tape drive and the reproduction of the recorded video signals on magnetic tape T. A preroll control element 15PR is used to preroll magnetic tape T to a predetermined address where it is positioned or "parked". A preview control element 15PV is used to preroll a tape to a predetermined address, from which point magnetic tape T is then forwarded at the normal reproduction speed. In the preferred embodiment, if a preroll operation has already been performed, magnetic tape T is forwarded immediately without any preroll when preview control element 15PV is actuated.

As more fully described hereinbelow, selected operation of preroll control element 15PR and preview control element 15PV initiates three separate functions of controller 15: one function, in which the varied playback speeds are stored for subsequent replay, a second function, in which the tape is wound to a predetermined point and then halted before being advanced in accord with the stored playback speeds, and a third function, in which the tape is wound to a predetermined point and then immediately advanced in accord with the stored playback speeds.

Controller 15 includes a variable speed selection control element 16 which is used in both presetting and executing selected or predetermined movements of magnetic tape T. A search dial 17 is included with controller 15 and sets the speed of magnetic tape T. Search dial 17 is calibrated so that the selected speed can be any variable number from minus 1 (reverse normal speed) to plus 3 (three times normal speed). A buzzer 18 sounds to indicate the selected "in" point on magnetic tape T.

A memory 19 is connected by a bus line with system controller 8. As more fully described with reference to FIG. 2 memory 19 includes a plurality of memory sections or locations $M_1$ to $M_{n+1}$ where pairs of tape speed and duration data are stored.

Controller 15 includes an indicator lamp 26 which visually indicates when magnetic tape T is transported in accord with the stored speed and duration signals.

A tape speed change detector 20 is connected to system controller 8 and detects from the tape the speed selected by search dial 17. Tape speed change detector 20 supplies an output signal to an address counter 21 and to a clock signal counter 23. Each time the speed selected by search dial 17 changes, tape speed change detector 20 supplies an output signal to address counter 21 whereby address counter 21 counts to the next address in memory. Clock signal counter 23 counts the duration of each speed selected by search dial 17. The output signal from tape speed change detector 20 increments address counter 21 and clears clock signal counter 23. Address counter 21 supplies an address signal to memory 19. A +1 address circuit 21a receives the output signal from address counter 21 and supplies an address signal to memory 19 which is incremented by one word beyond the address of the address signal from address counter 21. Accordingly, the address from +1 address circuit 21a indicates the end of the selected block in memory 19 containing the executed speed and duration signals. It is to be appreciated that the end of each data block in memory 19 also corresponds to the beginning address of the subsequent or next data block.

A clock signal is supplied from input terminal 22 to clock signal counter 23 and can have a frequency, for example, corresponding to one video frame.

An end mark signal indicating the end of each data block containing the duration and speed data pair is supplied from an input terminal 24 to memory 19 at a location supplied by +1 address circuit 21a. In a preferred embodiment, the end mark signal was chosen to be hexadecimal number 7F, and corresponded to an end mark in a redundancy code.

It is to be appreciated that a significant aspect of the present invention resides in the flexibility it allows for reproducing video signals recorded on magnetic tape T at various time periods and at corresponding selected speeds. FIGS. 2 and 3 illustrate the relationship between the tape speed data $S_i$ and the time duration data $T_i$ which represent the selected tape playback movements. In FIG. 2, memory 19 is arranged into data blocks $M_i$ (i=1 to n+1). Each data block $M_i$ is divided into two groups of data: tape speed data $S_i$ and time duration data $T_i$. The sum of all of the data blocks $M_i$ (i=1 to n) describes the preselected movements of magnetic tape T on playback.

For a more complete understanding, reference is made to FIG. 3 in which magnetic tape 3 is driven at a speed $S_1$ corresponding to a normal reproducing speed (+1) for a time duration $T_1$. (The data block $M_1$ of FIG. 2 stores the time and speed duration $S_1$ and $T_1$.) Subsequent thereto, magnetic tape T is driven at a reproducing speed $S_2$ corresponding to a slower than normal speed (indicated in FIG. 3 as approximately $+\frac{1}{2}$) for a time duration of $T_2$. (Data block $M_2$, depicted in FIG. 2, contains the speed and time duration data $S_2$ and $T_2$.) Following execution of the data contained in data block $M_2$, magnetic tape T is driven at a third speed $S_3$ corresponding to the normal reproducing speed (+1) for a time period $T_3$. (Data block $M_3$ of FIG. 2 contains the speed and time duration data $S_3$ and $T_3$.) Thus, it is to be appreciated that memory 19 contains time and speed duration data corresponding to each segment of magnetic tape T played back at a selected speed and for a selected time.

The operation of a video signal reproducing apparatus in accord with the present invention for storing a preselected speed curve is next to be described. Variable speed selection control element 16 is actuated, and "in" point address control element 15I is actuated to enter the "in" point address. (Alternatively, the "in" point address can be selected by actuation of keyboard 15a.) The desired initial playback speed for magnetic tape T is set through search dial 17, and preroll control element 15PR and preview control element 15PV are actuated simultaneously. Magnetic tape T is prerolled to an address given by the following expression:

[(INPOINT ADDRESS)−(INITIAL SPEED ×PREROLL TIME)].

Magnetic tape T is then driven at the initial speed until it is positioned at the "in" point. At such time, buzzer 18 chirps to indicate that the "in" point has been reached. The operator then determines the speed curve to be used on playback by selectively actuating search dial 17. After the speed curve has been stored in memory 19, a control element such as stop control element 15S can be actuated to terminate the aforedescribed memory mode. In a preferred embodiment, the preroll time can be selected to range from 0 to 15 seconds by a selector switch (not shown).

There are two modes in which the speed curve stored in memory 19 can be used to play back magnetic tape T: a waiting mode and a repeat of speed mode. The mode referred to as the waiting mode is next to be described. In such mode, the variable speed selection control element 16 is actuated, and then preroll control element 15PR is actuated. Magnetic tape T is prerolled up to the address indicated by the following expression:

[(INPOINT ADDRESS)−(INITIAL SPEED×PREROLL TIME)].

Magnetic tape T is positioned at the aforementioned point. Preview control element 15PV is actuated to play magnetic tape T in accord with the speed curve stored in memory 19.

The apparatus in accord with the present invention can also be operated in the repeat of speed mode, as next to be described. In the second mode, variable speed control element 16 is first actuated and then preview control element 15PV is actuated. A preroll is performed on magnetic tape T to an address indicated by the following expression:

[(INPOINT ADDRESS)−(INITIAL SPEED×PREROLL TIME)].

Magnetic tape T is then played back at the initially set speed. When magnetic tape T is positioned at the predetermined "in" point, magnetic tape T is played back in accord with the speed curve stored in memory 19. When the end mark indicating the end of the stored speed curve is detected, the variable speed mode is cleared and the tape continues running at the final speed.

It is to be appreciated that the first mode of playback, the waiting mode, is particularly useful in playing back portions of sports broadcasts which have been taped. In such instances, the editor can preview the selected portion of the sports event and store in memory 19 a speed curve for use with a desired audio commentary. After the previewing operation, magnetic tape T can be parked at the predetermined start address for subsequent playback.

The waiting mode is also useful when a video tape is to be edited. As is known in the art, video tapes are generally rerecorded in an editing operation. In the editing procedure, a first video tape recorded with the original program material is placed in a play mode. A second video tape recorder which produces the final tape is placed in a record mode. The "in" points on both video tapes must be reached simultaneously for an accurate editing operation to be performed. The apparatus in accord with the present invention is particularly useful in simultaneously positioning the two video tape recorders at the "in" points.

FIG. 4 is a graphical illustration of the movements of magnetic tape T with tape speed on the vertical axis and time on the horizontal axis. In the figure, magnetic tape T is advanced in the normal play speed (+1) beyond the "in" point. A preroll operation is then performed in which the tape speed decreases and then reverses. After the preroll operation is performed, the tape speed is returned to the normal play speed (+1), when buzzer 18 sounds. Magnetic tape T is then transported in accord with the stored speed curve. After the movements of magnetic tape T have been controlled in accord with the stored speed curve, magnetic tape T is stopped.

After magnetic tape T has been halted, it is reversed in speed wherein a preroll operation is performed. The tape speed is then increased until an "in" point is reached as determined by the expression:

(PREROLL TIME)×(INITIAL TAPE SPEED).

When this "in" point is reached, magnetic tape T is transported in accord with the stored speed curve.

Figure 5C:
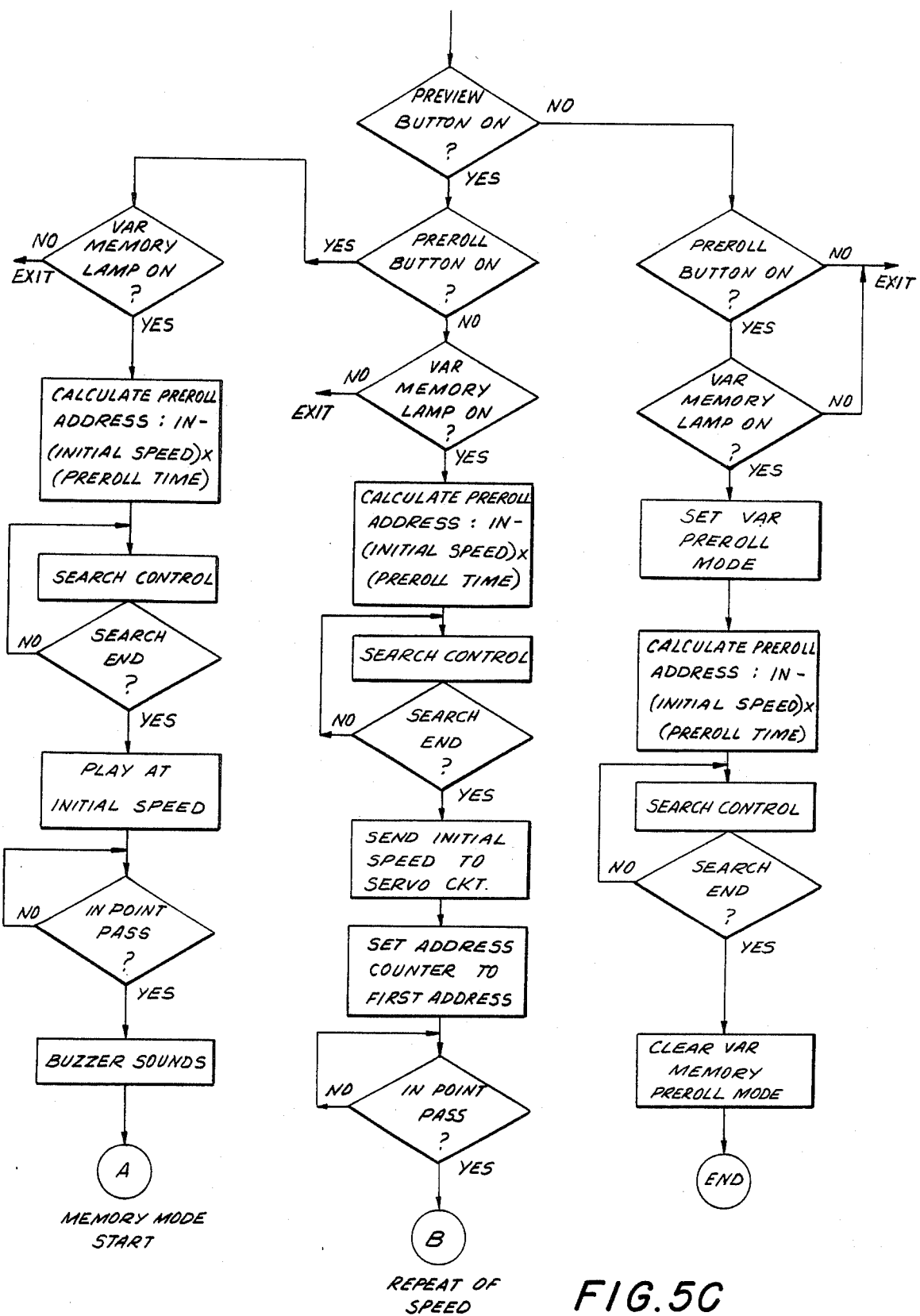

FIGS. 5A to 5C are flow charts for a program which can be used in a micro-processor included in an embodiment of the present invention. The flow charts of FIGS. 5A to 5C will cause system controller 8 to generate command signals whereby magnetic tape T is transported as hereinbefore described. A person of ordinary skill in the art will recognize that a suitable program can be prepared for any given micro-processor based upon the flow charts of the figures, and such program is not included herein.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. An information signal reproducing apparatus for use with a magnetic tape, comprising:
   transducer means for reproducing information signals recorded in slant tracks on said tape;

tape transport means for driving said tape at controllably varied transport speeds;

means for selectively generating a plurality of varied tape speed signals indicative of respective varied transport speeds of said tape;

means for selectively generating a plurality of varied time duration signals indicative of varied time periods during which said tape is driven at selected ones of said varied transport speeds;

means receiving said plurality of tape transport speed signals and said plurality of varied time duration signals for associating a speed signal with a duration signal to form a plurality of selected pairs;

memory means connected to said means for associating for storing said plurality of selected pairs of tape speed signals and duration signals at corresponding addresses therein; and system control means connected to address said memory means to read out said plurality of selected pairs of signals for controlling said tape transport means in response thereto to drive said tape at speeds and for durations determined by said plurality of selected pairs of tape speed signals and duration signals read from said memory means.

2. The apparatus of claim 1; and further comprising:
deflection means for mounting said transducer means; and tracking control means for supplying tracking control signals to said deflection means so that said transducer means properly scans said slant tracks on said tape.

3. In a video signal reproducing apparatus of the type including a rotary magnetic head for reproducing video signals recorded in slant tracks on a magnetic tape, deflecting means for mounting said magnetic head, tape transport means for driving said tape at controllably varied transport speeds, head position control means for supplying control signals to said deflecting means, whereby said magnetic head properly scans said tracks, said apparatus comprising means for selectively generating a plurality of different tape speed signals indicative of a respective plurality of different transport speeds of said tape, means operably associated with said magnetic tape for selectively generating duration signals indicative of time periods during which said tape is driven and corresponding to selected locations on said tape, speed and duration associating means connected to said means for generating tape speed signals and to said means for generating duration signals for associating one with another to form respective pairs of speed signals and associated duration signals; memory means for storing a sequence of said pairs of tape speed signals and duration signals, and system control means connected to said memory means and to said tape transport means for controlling said tape transport means to drive said tape at speeds and for durations determined by selected pairs of said tape speed signals and duration signals read out from said memory means.

4. The apparatus of claim 3; and further comprising means for storing an end mark signal in said memory means to indicate the end of said signals stored therein.

5. The apparatus of claim 3; in which said speed and duration associating means includes programming means connected to said system control means for preselecting movements of said tape and thereby the corresponding tape speed signals and respective duration signals stored as associated pairs in said memory means.

6. The apparatus of claim 5; wherein said programming means includes speed control means for preselecting said tape speed signals to be stored in said memory.

7. The apparatus of claim 6; and wherein said programming means includes means for prerolling said tape to a predetermined point located thereon.

8. The apparatus of claim 6; wherein said programming means includes means for determining a start point on said tape where the movements of said tape are controlled in response to said signals stored in said memory means.

9. The apparatus of claim 8; wherein said programming means operates in a first mode in which the tape movements are controlled by said speed control means and in a second mode in which said tape speed signals and said duration signals are stored in said memory means and said tape movements are controlled in response to said signals stored in said memory means, and wherein said proramming means includes mode selector means for selecting one of said first and second modes.

10. The apparatus of claim 9; wherein said programming means includes indicator means for indicating when said movements of said tape are controlled in response to said signals stored in said memory means.

11. The apparatus of claim 10; wherein said indicator means includes visually perceptible means for indicating when said movements of said tape are controlled in response to said signals stored in said memory means.

12. The apparatus of claim 10, wherein said indicator means includes audibly perceptible means for indicating when said movements of said tape are controlled in response to said signals stored in said memory means.

13. The apparatus of claim 9; wherein said programming means includes keyboard means for determining said start point.

14. The apparatus of claim 13, wherein said keyboard means determines an end point on said tape where said tape movements terminate being controlled in response to said signals stored in said memory.

15. The apparatus of claim 9; wherein said programming means includes preview means for prerolling said tape to said start point and then driving said tape in accord with said tape speed and duration signals stored in said memory means.

* * * * *